United States Patent [19]

Hestily

[11] 4,108,225
[45] Aug. 22, 1978

[54] DEPTH-OF-CUT MECHANISM FOR ROUTERS

[75] Inventor: Charles Edward Hestily, Greenville, S.C.

[73] Assignee: The Singer Company, New York, N.Y.

[21] Appl. No.: 796,507

[22] Filed: May 12, 1977

Related U.S. Application Data

[63] Continuation-in-part of Ser. No. 736,916, Oct. 29, 1976, Pat. No. 4,051,880.

[51] Int. Cl.² .............................................. B27C 5/10
[52] U.S. Cl. ................................. 144/134 D; 83/522; 90/12 D; 144/136 C
[58] Field of Search ...................... 310/29, 50, 91, 89; 90/DIG. 3, 12 D; 408/16; 83/522; 144/134 R, 134 D, 136 C

[56] References Cited

U.S. PATENT DOCUMENTS

| | | | |
|---|---|---|---|
| 1,532,683 | 4/1925 | Carter | 144/134 D |
| 2,613,704 | 10/1952 | Sacrey | 144/136 C |
| 2,842,173 | 7/1958 | Turner et al. | 144/134 D |
| 2,867,251 | 1/1959 | Moretti et al. | 144/134 D |
| 2,943,654 | 7/1960 | Emmons | 144/134 D |
| 2,988,119 | 6/1961 | Godfrey et al. | 83/522 X |
| 3,207,193 | 9/1965 | Godfrey et al. | 144/134 D X |
| 3,443,479 | 5/1969 | Hawley et al. | 90/12 D |
| 3,767,948 | 10/1973 | Batson | 144/134 D |

*Primary Examiner*—Frank T. Yost
*Assistant Examiner*—W. D. Bray
*Attorney, Agent, or Firm*—Harold Weinstein; Edward L. Bell; Robert E. Smith

[57] ABSTRACT

A portable electric router comprising a base having a dust chamber formed below a motor mounted to the base to be axially adjustable therein. A pair of handles are connected to the base with a passage formed in one of the handles in communication with the dust chamber. A blower is formed on the top side of the motor with the router connected to and driven by an extension from the motor armature shaft. A flexible conduit interconnects the handle passage and the blower, and a dust bag collects the dust and debris from the blower discharge. The conduit which interconnectes the handle and blower is flexible to permit axial adjustment of the motor within the base. The motor is journaled in a housing the lower half of which is threaded to receive an internally threaded ring member having outer and inner rings. The outer ring has a flat bottom which sits upon an annular flange formed at the top of the base. Rotation of the outer ring will raise or lower the motor housing to adjust the depth-of-cut. The inner ring is rotatably mounted in the outer ring and is calibrated to correspond to the vertical adjustment of the router bit. A pointer is cast on the base to permit the inner ring to be set to zero prior to rotation of the outer ring to the desired depth-of-cut dimension. A base clamp secures the motor housing within the base at the adjusted position.

4 Claims, 9 Drawing Figures

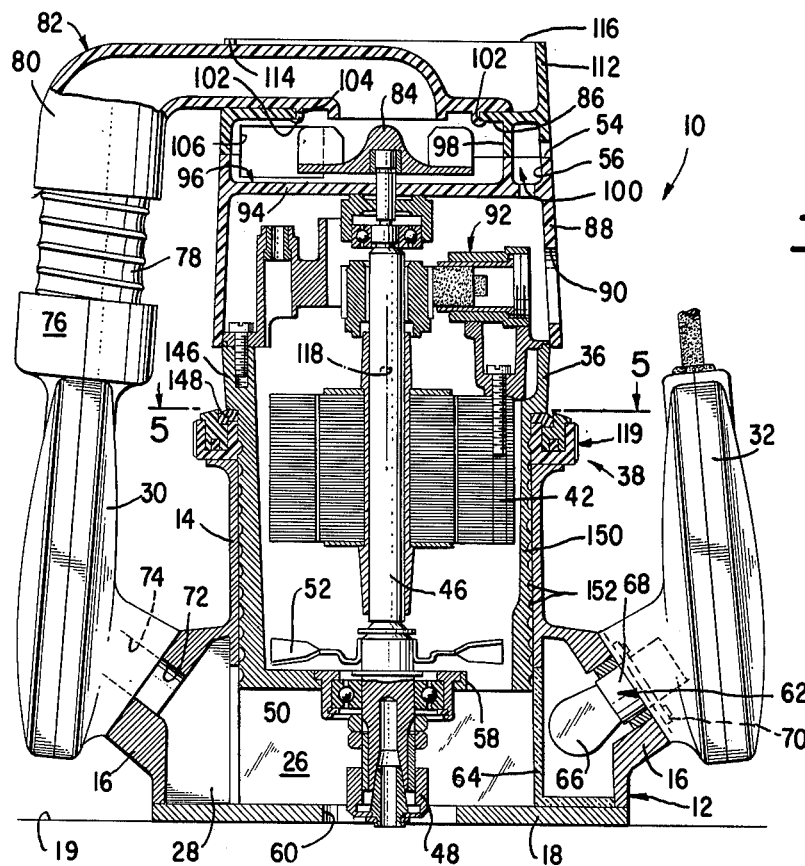
*Fig.1*
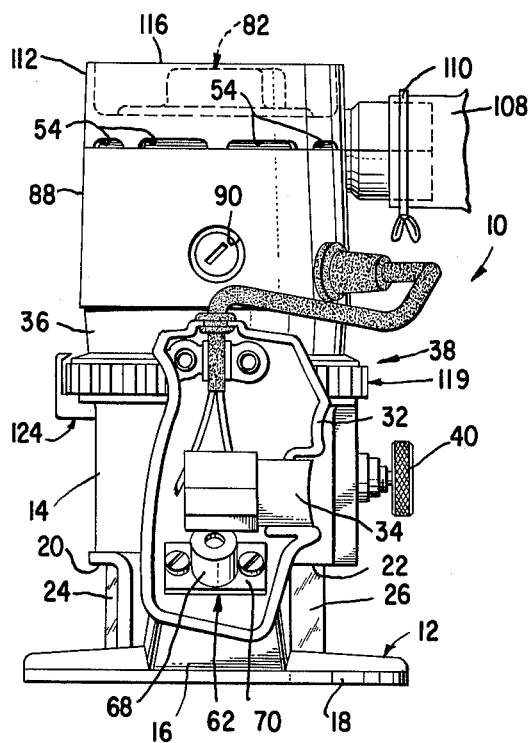
*Fig.2*
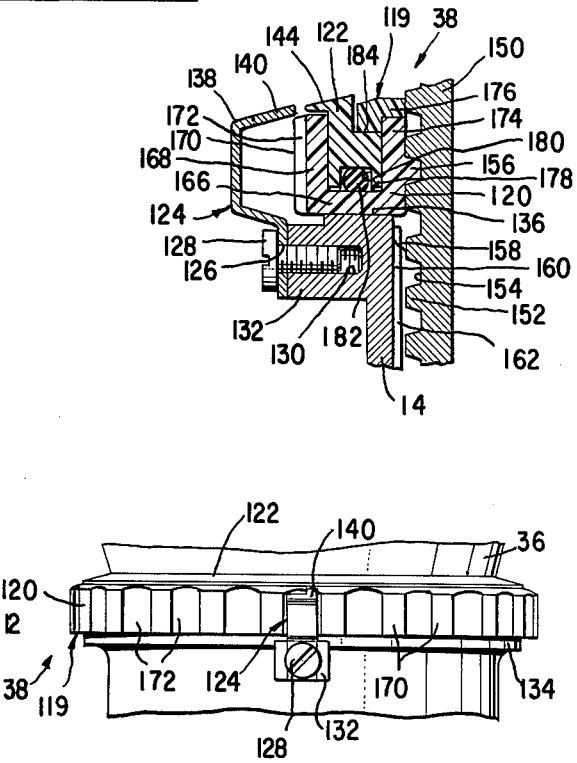
*Fig.4*
*Fig.3*

DEPTH-OF-CUT MECHANISM FOR ROUTERS

CROSS REFERENCE TO OTHER APPLICATIONS

The present application is a continuation-in-part of a copending application, U.S. Ser. No. 736,916, filed Oct. 29, 1976, now U.S. Pat. No. 4,051,880.

BACKGROUND OF THE INVENTION

Heretofore the prior art routers have made use of a rack and pinion mechanism, or a threaded motor housing adjustable for setting the depth-of-cut. When a threaded motor housing was used the depth-of-cut adjustment was made possible by either a separate piece such as an adjustable pointer or an independent vertically adjustable member. Such auxiliary devices were easily moved or misadjusted so as to adversely effect the accuracy of the setting. Also, since several disconnected parts had to be used the assembly and the adjustment was made more complex. Finally, the parts were not highly visible, and could be disconnected or lost so as to completely defeat the desired result of obtaining a depth-of-cut adjustment.

SUMMARY OF THE INVENTION

It is an object of the present invention to provide an improved depth-of-cut adjustment for routers which overcome the prior art disadvantages; which is simple, economical and reliable; which includes an integrally connected depth-of-cut mechanism; which includes a ring member; which ring member includes a pair of rotative rings, one to adjust to zero and the other to adjust the depth-of-cut; which includes a pair of integrally connected rings; which uses an outer ring threadedly connected to the motor housing to adjust the depth-of-cut thereof; which uses an inner ring calibrated to correspond to the pitch of the threads for setting the depth-of-cut; and which has a clamp for locking or releasing the motor housing and the base.

Other objects and advantages will be apparent from the following description of one embodiment of the invention and novel features will be particularly pointed hereinafter in the claims.

BRIEF DESCRIPTION OF THE DRAWINGS

This invention is illustrated in the accompanying drawings in which:

FIG. 1 is a front elevational view, partly in section, of a portable electric router embodying the present invention, FIG. 2 is a side elevational view, partly in section, of the router embodying the present invention, FIG. 3 is a front fragmentary elevational view showing the depth-of-cut mechanism of the present invention, FIG. 4 is a sectional elevational view taken along lines 4—4 of FIG. 3;

DESCRIPTION OF THE INVENTION

Figure 5:
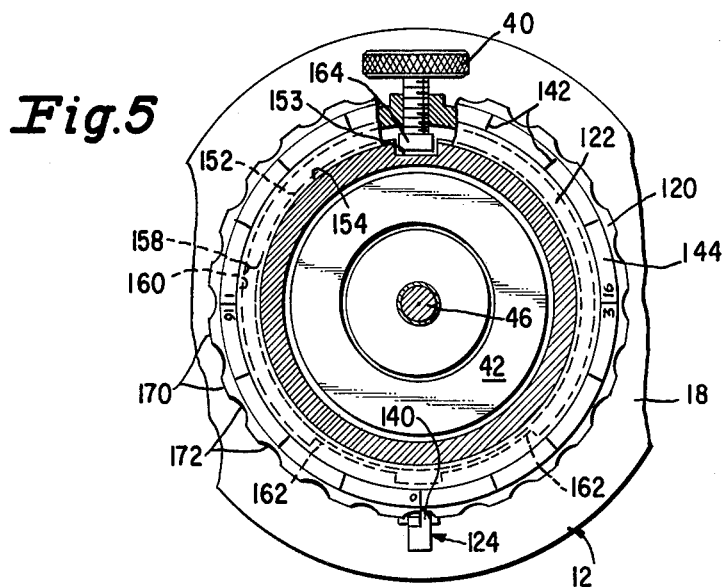
FIG. 5 is a top plan view taken along lines 5—5 of FIG. 1.

In the illustrated embodiment of the invention a router, designated generally as 10, is depicted in FIGS. 1 and 2 as having a stationary base 12 the upper portion of which is in the form of a cylindrical sleeve 14. The sleeve 14 has two downwardly extending diametrically opposed struts 16 which terminate in a flat bottom 18 the underside of which defines a reference plane 19 that will contact the work (not shown). Large openings 20 and 22 are provided on opposite sides of the struts 16 between the sleeve 14 and the bottom 18 through which the operator may observe the work. The openings 20 and 22 are enclosed by a detachably connected plastic shrouds or windows 24 and 26, respectively, so as to enclose the sides of a dust chamber 28 formed in the hollow interior of the base 12 without interfering with operator visibility as shown in FIGS. 1 and 2.

A pair of handles 30 and 32 shown in FIG. 1 are connected to the struts 16. The handle 32 appearing on the right side of FIG. 1 is shown in FIG. 2 as having a trigger switch 34 mounted therein for controlling actuation of the router 10.

A motor housing 36 as shown in FIGS. 1 and 2 is adapted to telescope within the base 12 for vertical sliding motion relative thereto. A suitable depth-of-cut mechanism 38 illustrated in FIGS. 1 and 2 is rotated to adjust the depth-of-cut of the router 10 as more fully explained hereinafter. A clamp 40 shown in FIGS. 2 and 5 which when tightened will clamp the motor housing 36 in adjusted position, or when loosened will permit adjustment thereof via mechanism 38.

A series commutator electric motor 42 shown in FIG. 1 is journaled in the motor housing 36 and in circuit with the trigger switch 34 via switch cable 44, and a power cable (not shown). The motor 42 has an armature shaft 46, the lower end of which has affixed thereto a bit carrying chuck 48 disposed externally of the lower wall 50 of the motor housing 36. A fan 52 is affixed to the armature 46 adjacent the lower wall 50 on the internal side thereof. The fan 52 provides ventilation for the motor 42 by drawing air in through apertures 54 and passage way 56 formed adjacent the upper end of the motor housing 36 as illustrated in FIGS. 1 and 2, and exhausting it through apertures 58 of the lower wall 50, one of which is shown in FIG. 1, to blow directly into the dust chamber 28.

Figure 7:
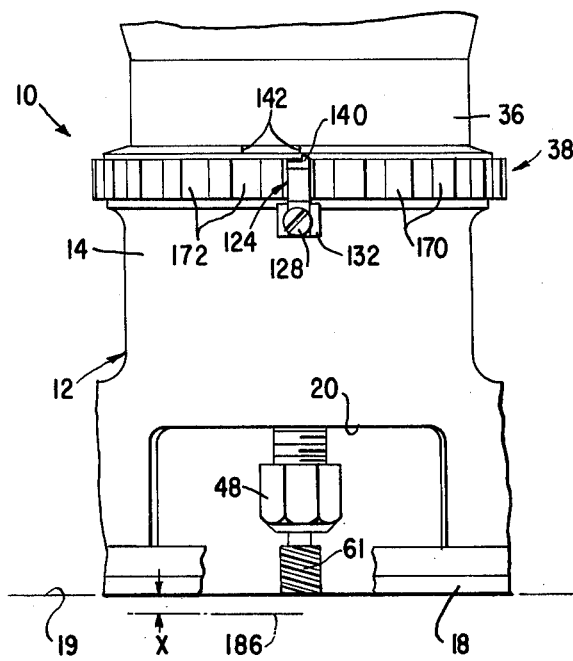
FIG. 7 is a fragmentary front elevational view with the depth-of-cut mechanism in the zero setting corresponding to FIG. 6 with the router bit just at the reference line.
Figure 9:
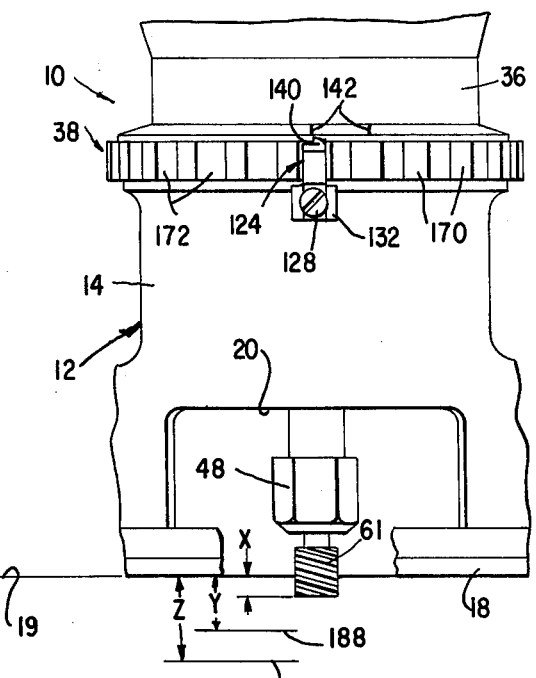
FIG. 9 is a fragmentary front elevational view with the depth-of-cut mechanism set at the predetermined dimension corresponding to FIG. 8.

The chuck 48 extends into the dust chamber 28 in alignment with a central aperture 60 formed in the flat bottom 18 to permit a bit 61 shown in FIGS. 7 and 9 to engage the work. The dust chamber 28 is illuminated by a light 62 mounted in handle 32, with the light 62 connected to be lit whenever the switch 34 is on. A plastic guard 64 is fitted on the internal side of the strut 16 to protect the bulb 66 of the light 62. The guard 64 is disposed below the sleeve 14 at a radial distance equal to the sleeve 14 so as not to interfere with the adjusting movement of the motor housing 36. The light 62 has a socket 68 to which the bulb 66 is connected, with the sockets affixed to a bracket 70 which serves to connect the light 62 within the strut 16.

The opposite strut 16 has a dust passage 72 aligned with a dust passage 74 formed in the handle 30. The dust passage 74 extends the full length of the handle 30 which terminates in a circular collar 76. The collar 76 is sized to snuggly receive the lower end of a flexible conduit or hose 78. The upper end of the conduit 78 is received in a rigid inlet conduit 80 of a blower 82, which inlet has an internal diameter substantially equal to that of the collar 76. The conduit 80 will axially introduce the flow in the blower 82 to a rotor 84 affixed to an upper extension of the armature shaft 46 which extends into the blower portion 86 of the motor housing 36.

The blower portion 86 of the motor housing 36 is formed in an end cap 88 which may conveniently be made of a suitable plastic material. A brush access 90 is formed in the end cap in spaced relation to the brush assembly 92 of the motor 42. A partition wall 94 divides the end cap 88 with the motor 42 disposed below and the blower 82 disposed thereabove. A blower convolute 96 is formed on the internal side of a vertical partition wall 98, on the external side thereof is formed a motor inlet convolute 100 which communicates the inlet passageway 54 and 56 with the motor portion of the housing 36. The inlet conduit 80 is connected by tabs 102 within a central opening 104 of the blower 82 as illustrated in FIG. 1. The blower convolute 96 delivers the discharge from the rotor 84 to a discharge outlet 106 having a dust bag 108 detachably connected thereto by a suitable tie string 110.

The end cap 88 has a vertical flange 112 shown in FIG. 1 to be slotted at 114 through which the rigid inlet conduit 80 passes and is positioned. The conduit 80 lies below the flat upper edge 116 of the flange 112.

Actuation of the rotor 10 will produce rotation of the fan 52 to ventilate the motor 42, and rotation of the rotor 84 of the blower 82. The blower 82 will draw air from the dust chamber which air will include dust and debris whenever the router 10 is operated on work. The drawn air will enter dust passages 72 and 74, and then pass the flexible conduit 78 into the conduit 80 for axial delivery to the rotor which discharges the dust laden air into the convolute 96 and outlet 106 for collection in the dust bag 108.

The router 10 is designed in quadrant fashion whereby the handles 30 and 32 lie along a line on either side of the axis 118 of the armature shaft 46, while the discharge outlet 106 of the blower 82 is disposed perpendicular to such line and parallel to the clamp 40 at what may be termed the "rear" of the router 10. This leaves the "front" of the router 10 clear for better operator visibility of the bit 61 as viewed through the shroud 24 and the depth-of-cut mechanism 38 as illustrated in FIG. 2. Visibility is also aided by not only locating the dust bag 108 at the "rear" of the router 10, but also by locating the blower 82 in a local remote from the flat bottom 18 and above the handles 30 and 32.

The flexible conduit 78 is expandable and contractable so as to permit free adjustment of the motor housing 36 in setting of the depth-of-cut of the router 10, while still maintaining connection between the collar 76 and the inlet conduit 80.

The depth-of-cut mechanism 38 illustrated in FIGS. 2, 3 and 4 includes a ring member 119 having a pair of interconnected rings 120 and 122, and a fixed pointer 124. The pointer 124 is preferably a bent metal piece having a flat lower portion with an aperture 126 through which a screw 128 passes to be threadedly received in a tapped hole 130 formed in the boss 132 which extends radially outwardly from the base 14 just below a radially outwardly turned flange 134 whose top surface defines a flat annular horizontal surface 136 shown in FIGS. 1 and 4, which is parallel to the reference plane 19. The boss 132 is formed on the quadrant line at the front of the base 14 diametically opposite the clamp 40 as shown in FIGS. 2 and 5. This locates the pointer 124 in the highly visible front of the router 10 to provide clear viewing by the operator. The pointer 124 extends axially upwardly from its base 14 connection to be bent radially outwardly to provide clearance for the ring 120 at a straight section prior to being bent radially inwardly at the upper section 138 which carries finger 140 the inner edge of which defines a straight line for reading the dimensional calibrations 142 illustrated in FIG. 5 which are stamped on the inclined upper surface 144 of the inner ring 122. The finger 140 is relatively slender and is formed on the right side as viewed in FIGS. 3 and 5 of the upper section 138 by a cutout section having removed a square portion of the end material slightly above the bend forming the upper section 138. The inner edge of the finger 140 defines the straight line which will be aligned with any one of the desired multiple calibration 142 of the inner ring as explained more fully hereinafter.

The motor housing 36 has a cylindrical upper section 146 which terminates in a radially inwardly extending annular shoulder 148 which leads to a lower cylindrical section 150 which is threaded by threads 152 along the substantially full axial length of its outer circumference. A vertical slot 153 shown only in FIG. 5 interrupts the threads 152. The threads 152 are formed by a broad helical tooth having a wide flat vertical face with a deep groove 154 which has a correspondly wide flat vertical base to receive the companion threads 156 formed on the inner periphery of the outer ring 120, as illustrated in FIGS. 1 and 4. An annular space 158 is formed between the threads 152 of the lower section 150 and the inner circumference 160 of the base 14. A pair of arcuate pads 162 one of which is shown in FIG. 4 and each is shown in dotted representation in FIG. 5 are disposed on either side of the boss 132 to project into the space 158 substantially along the axial length of the inner circumference 160. A third clamping pad 164 is connected to and radially shiftable by the clamp 40 whereby the pad 164 will extend into the vertical slot 153 of the motor housing 36 to prevent relative rotation between the base 14 and the motor housing 36 without interfering with the axial adjustment of the motor housing 36 whenever the clamp 40 is loosened. Upon tightening of the clamp 40 the clamping pad 164 will be locked within the slot 153, thus to force the motor housing 36 against the pair of arcuate pads 162 on the opposite side of the base adjacent to the boss 132 so as to clamp the motor housing 36 securely to the base 14 and prevent further axial movement of the motor housing 36. The radius of the arcuate pads 162 is coincident to the axis 118 of the armature shaft 46 so that in the clamped position the motor housing 36 is properly centered within the base 14 for accurate operation of the router 10.

The outer ring 120 of the ring member 119 is substantially "U" shaped in section as is shown in FIG. 4 and has a base 166 disposed substantially horizontal with the flat underside thereof nesting upon the flat surface 136 of the flange 134. The base 166 upturns at the outer end to form a vertical leg 168 having axial ridges 170 formed between arcuate grooves 172 about the outer circumference of the leg 168. An inner vertical leg 174 is formed at the inner end of base 166 and carries the thread 156 on the inner circumference thereof. A retaining member 176 is fixed to the top of the leg 174 and has a portion extending a short distance into the open top of a space 178 formed between the legs 168 and 174. The second or inner ring 122 of the ring member 119 is disposed in the open space 178 to fit loosely between the legs 168 and 174 to permit a relative rotative or sliding motion between the outer ring 120 and the inner ring 122. The bottom of the inner ring 122 has a recess 180 into which is connected an O-ring 182 to provide a high friction contact surface between the inner ring 122 and the upper surface of the base 166 of the outer ring 120 so that while relative sliding motion is permitted such motion is only possible upon positive engagement of the tappered upper surface 144 which overhands the outer leg 168. The O-ring 182 raises the inner ring 122 off of the base 166 to provide a resilient sliding fit between the relative rotative parts of the rings 120 and 122. The top surface 144 of the inner ring 122 has a cut out portion which forms an upper shoulder 184 which extends below the retaining member 176 which being connected to the inner leg 174 prevents removal of the inner ring 122 but does not interfere with the sliding rotative motion thereof relative to the outer ring 120.

The calibrations 142 are shown in FIG. 5 whereby each mark represents 1/64th of an inch and one complete rotation of the ring will raise or lower the motor housing by ¼ of an inch, and each quadrant or quarter of a turn will equal 1/16 of an inch. The pitch of the threads 152 correspond to the calibrations 142. Of course any pitch for the threads 152 could be used so long as it is coordinated with the calibrations 142.

The ring member 119 will be threadedly connected to the lower section 150 of the motor housing 136 prior to the motor housing 36 being inserted into the central opening of the base 14. Once inserted the ring member 119 will rest upon the flange 134 of the base 14. There is sufficient surface area provided by the horizontal engagement between the ring member 119 and the flange 134 and the vertical contact between the pads 162 and 164 with the lower section 150 so as to provide suitable stability and concentric positioning of the axis 118 to protect against wobble or inaccurate cutting due to housing misalignment by the router 10.

Whenever the operator desires to adjust the depth-of-cut of the bit 61 shown in FIG. 7 and 9 the clamp 40 will be loosened to permit relative axial motion between the base 14 and the motor housing 36.

Figure 6:
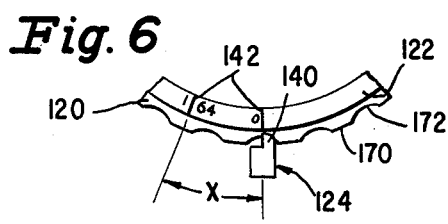
FIG. 6 is a fragmentary top plan view of the depth-of-cut mechanism in the zero setting.

While the ring member 119 is illustrated in FIGS. 5 and 6 as having been placed in the position of having the zero setting of its calibrations 142 this adjustment may be coincidental. The operator will have to have loosened the clamp 40 and place the router upon the work surface which corresponds to the reference plane 19 as depicted in FIG. 7. The ring member 119 including both rings 120 and 122 will be rotated to raise or lower the motor housing 36 so as to place the tip of the bit 61 which is connected to the chuck 48 so that its leading edge just touches the reference plane 19. The clamping pad 164 is disposed in the vertical slot 153 below the ring member 119 so that though the pad 164 is radially inwardly of the threads 152 there is no interference from the pad 164 with the mating engagement of threads 152 and 156. Rotation of the ring member 119 causes the contact between the respective threads 152 and 156 to helically advance the motor housing 36 axially upwardly or downwardly depending on the direction of rotation which is shown in FIG. 5 to require counter-clockwise rotation to shift the motor housing 36 downwardly. As a practical matter reference to rotation of the ring member 119 refers to the outer ring 120 being rotated and having the inner ring 122 going along for the ride. Rotation of the ring member 119 may have shifted the zero setting of calibrations 142 of the inner ring 122 to one side or the other of the pointer 124 and it is now necessary with the bit in the position shown in FIG. 7 for the operator to adjust the inner ring 122 to the zero setting by rotating the inner ring 122 only in either direction so as to align the zero calibration 142 with the inner edge of the finger 140 as shown in FIG. 6. In the present instance the desired depth-of-cut is represented by an "X" dimension which for descriptive purposes is depicted in FIG. 6 as being equal to 1/64 of an inch. This will establish a depth-of-cut plane 186 shown in FIG. 7 as lying parallel to the reference plane 19 and spaced therefrom by the representative distance "X".

Figure 8:
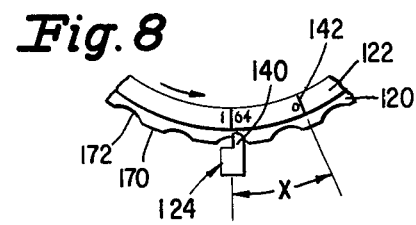
FIG. 8 is a fragmentary top plan view of the depth-of-cut mechanism rotated to a predetermined dimension.

In order to lower the bit 61 by the desired dimension "X" the ring member 119 is rotated counterclockwise as viewed in FIGS. 5 and 9 by the desired dimension which for the present instance is a single marked calibration so as to place the 1/64 of an inch setting in alignment with the inner edge of the finger 140 of the pointer 124 as illustrated in FIG. 8. Rotation of the ring member 119 affects a lowering of the bit by the same "X" dimension which is noted as being equal to 1/64 of an inch. In the drawings for purposes of dramatization the "X" dimension referred to is not shown to scale. The tip of the bit 61 is now at the level of the depth-of-cut plane 186 which is shown in FIG. 9 as being below the reference plane 19 by the desired "X" distance. In this position the clamp 40 will be tightened to lock the motor housing 36 in adjusted position against the base 14 so as to place the router 10 in adjusted position ready to be operated.

The calibrations are formed upon the tapered surface 144 of the inner ring 122 to provide something for the operator to grasp in rotating the inner ring 122 relative to the outer ring 120. However, other suitable ridges or projections could have been used as was done with the outer ring 120. While the sliding motion of the inner ring 122 relative to the outer ring 120 is smooth the high friction contact of the O-ring 182 against the base 166 of the outer ring 120 will require more than the slightest touch or a brushing motion so as to avoid the possibility of accidental movement of the inner ring 122 or misadjustment thereof.

In operation the router 10 having the improved depth-of-cut mechanism 38 can be used for multiple depth-of-cut settings shown in FIG. 9 with reference to the reference plane 19 as being a "Y" dimension which would establish a depth-of-cut plane at reference character 188, or as a "Z" dimension which would establish a depth-of-cut plane at reference character 190. In each case the operator would determine whether it was necessary to return the depth-of-cut mechanism 38 to the zero setting illustrated in FIG. 6 and 7, or merely to release clamp 40, adjust the ring member 119 to the new desired depth-of-cut calibration 142 and reclamp the clamp 40.

The combination of the use of broad ridges on the outer ring 120 and broad threads 152 and 156 render the raising and lowering of the motor housing 36 relative to the base 14 an easy adjustment for the operator.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention, what is claimed herein is:

1. A portable electric router comprising:
  (a) a base having an open top and a flat bottom defining a reference plane,
  (b) a motor housing having a threaded section slidably received in the base, and free to move vertically, but restrained from rotation therein,
  (c) a motor journaled in the motor housing and carrying a bit at its lower end,
  (d) a pointer fixedly connected to the base adjacent the open top thereof and extending radially outwardly therefrom,
  (e) a ring member including an outer ring within which an inner ring is entrapped,
  (f) the ring member being nestable upon the open top of the base,
  (g) the outer ring being threadedly connected to the motor housing,
  (h) the inner ring having calibrated outward extension, and
  (i) the inner ring being selectively rotative independently of, or in combination with the outer ring relative to the pointer to permit vertical adjustment of the motor housing to a predetermined depth-of-cut of the bit relative to the reference plane.

2. The combination claimed in claim 1 wherein:
  (a) a resilient means is interconnected between the inner ring and the outer ring to provide a high friction contact therebetween,
  (b) the inner ring is calibrated dimensionally from zero to a predetermined dimension, and
  (c) the inner ring is adjustable to and is holdable by the resilient means in the zero calibration setting prior to the ring member being rotated to set the motor housing depth-of-cut.

3. The combination claimed in claim 1 wherein:
  (a) the outer ring is substantially "U" shaped in cross section and receives the inner ring therein,
  (b) a retaining member is affixed to the outer ring to prevent removal of the inner ring,
  (c) a resilient means is disposed between the outer ring and the inner ring and compressed thereby to provide a high friction contact therebetween,
  (d) the outward extension of the inner ring defines an upper projection extending radially above the outer ring, and
  (e) the upper projection carries the dimensional calibrations thereon.

4. The combination claimed in claim 3 wherein:
  (a) a clamping means is connected to the base to lock or release the motor housing with respect to the base,
  (b) the clamp includes a clamping pad positioned adjacent to the motor housing,
  (c) the clamping pad is disposed below the ring member,
  (d) a vertical slot is formed on the outer circumference of the threaded section of the motor housing to interrupt the threads thereof, and
  (e) the clamping pad is disposed within the vertical slot to prevent rotation of the motor housing relative to the base and to permit axial movement of the motor housing.

* * * * *